Patented Dec. 6, 1938

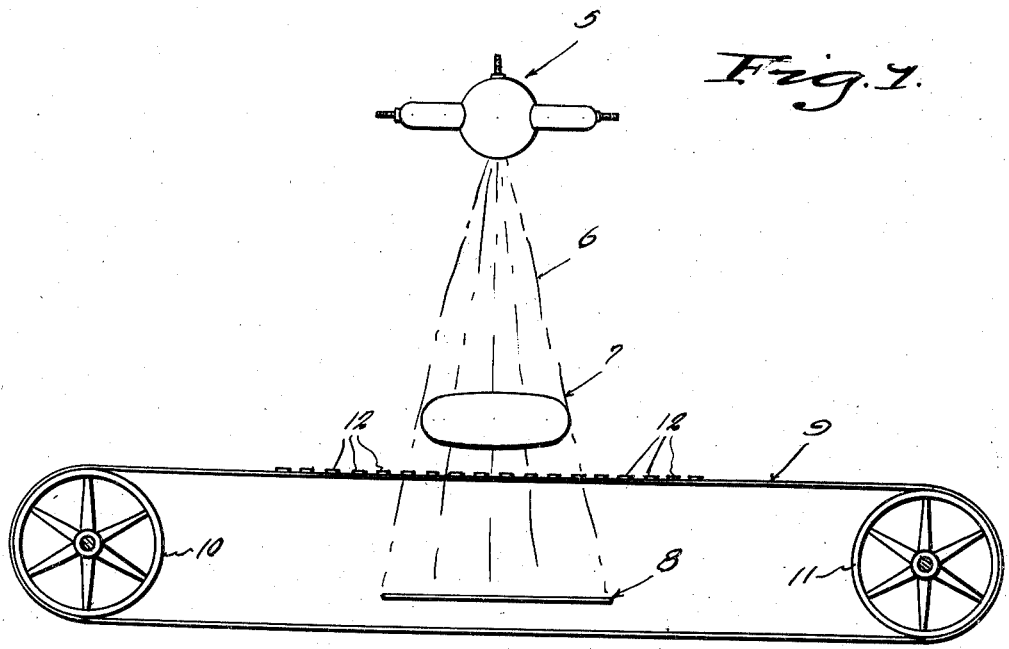
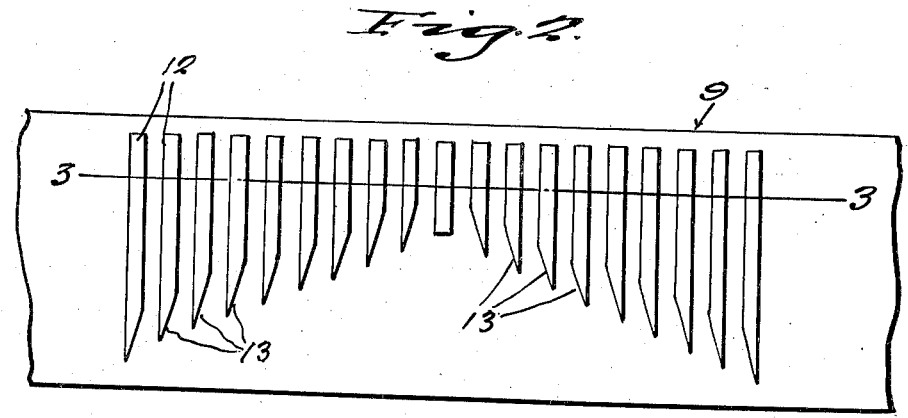

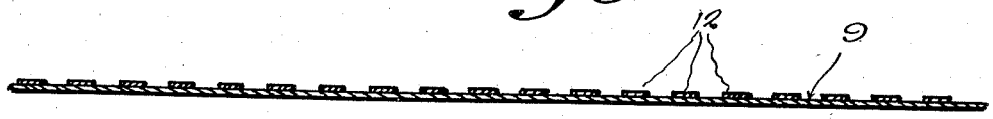
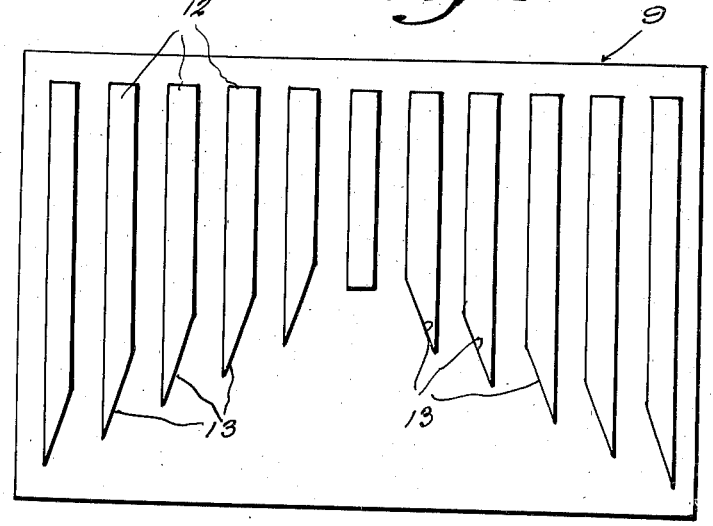
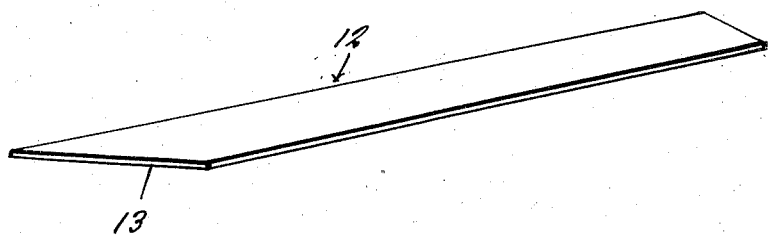

2,139,098

UNITED STATES PATENT OFFICE 2,139,098

FILTER FOR X-RAYS AND SIMILAR RAYS

Ben Butler Raney, Linton, Ind.

Application February 27, 1934, Serial No. 713,205

3 Claims. (Cl. 250—63)

My invention relates generally to radiography apparatus and particularly to means for filtering radio active rays so as to reduce the exposure time over different parts of the film and thereby distribute the effect of the radio active rays over a film in a predetermined, non-uniform manner.

It is an important object of my invention to provide a mobile screen or filter of the character described which, unlike the Potter-Bucky diaphragm, which effects a uniform distribution of filtering effect over the surface of the film, contemplates bringing about ununiform and predetermined exposure of different parts of the film.

It is also an important object of my invention to provide a screen or filter of the character described above which contains areas opaque to the rays and other areas transparent to the said rays, wherein the opaque areas offer as much resistance as possible to rays emanating from the focal point of the ray source, and offer as little resistance as possible to secondary radiation from said source; in contrast to the arrangement in the Potter-Bucky diaphragm wherein the opaque areas are arranged so as to offer as little as possible resistance to rays emanating from the focal point of the source, and as much resistance as possible to secondary radiation therefrom.

It is also an important object of my invention to provide a method of radiographing the human body and other objects wherein the primary and secondary emanations are distributed in a predetermined manner after emergence from the source, so as to apportion the film affecting force of different portions of said emanations according to the opacity and penetrability of corresponding parts of the body or other objects, so as to attain in the resulting radiographs a clarity of detail not heretofore accessible in a single radiograph.

Other objects and advantages of my invention will be apparent from a reading of the following description in connetion with the drawings, wherein for purposes of illustration I have shown a preferred embodiment of my invention.

In the drawings:—

Figure 1 is a side elevational view showing fragmentarily an embodiment of the invention intercepting the rays from an X-ray tube after passage of the rays through the object being radiographed and before the rays reach the sensitive film.

Figure 2 is a top plan view of a portion of the screen or filter of my invention.

Figure 3 is a longitudinal vertical sectional view through Figure 2 taken approximately on the line 3—3.

Figure 4 is an enlarged plan view of a screen or filter in accordance with the invention showing the distribution and arrangement of the opaque and transparent areas.

Figure 5 is a perspective view of one of the bodies constituting one of the opaque areas.

Referring in detail to the drawings, the numeral 5 refers generally to a source of radio active emanations, such as an X-ray tube, and the numeral 6 refers generally to rays emanating from the X-ray tube and impinging upon and passing through the object 7 being radiographed, to affect the film 8.

The screen or filter of the invention may with equal success be arranged on the periphery of a wheel or drum which is rotatable, or fastened to a belt which is movable at a continuous rate, or to a belt which vibrates at a constant rate, or secured to the top of a Potter-Bucky diaphragm so that as the diaphragm moves the arrangement of the invention will move in unison therewith, or the arrangement of the invention may be carried and moved by any suitable mechanical means. By showing the arrangement of the invention carried and moved by a continuous belt in the present disclosure, I desire merely to illustrate an embodiment of the invention to meet the requirement of law respecting a disclosure in a patent application, and do not desire to limit or circumscribe the invention by so doing.

In the present embodiment of the invention a continuous belt 9 of suitable flexible material is trained over a pair of pulleys 10, 11 which are rotated at a uniform rate of speed. Although I have shown the filter of my invention disposed between the object being radiographed and the film, substantially similar results are obtainable by placing the filter between the X-ray tube 5 and the object 7. Since it is not one of the objects of the present invention to deal with or restrict secondary radiation, the device of the invention may be employed either with or without a Potter-Bucky diaphragm, according as it may be desired or not desired to restrict secondary radiation. In the present invention the time of exposure to the primary radiation is restricted over certain areas of the film but never in a uniform manner over the entire film.

The screen or filter of the invention is constructed by fastening to the belt 9 lead or similar X-ray opaque material strips or plates 12, which may vary in length, thickness, width, relative spacing, and relative positioning on the belt, according to the presence in the object being radiographed of portions of different opacity or penetrability, the object being to secure the greatest exposure time for such portions of the object being radiographed as offer the greatest resistance to the passage of the rays, thereby affording the corresponding areas of the film a relatively increased exposure time which brings out parts thereof which the ordinary method of radiography ordinarily show in partial or total obscurity and lack of detail.

In applying the principles of the invention in the radiographing of the object 7 having portions at its ends of less thickness and hence, ordinarily, of greater penetrability than middle portions of the object, I arrange strips 12 in a series in which the plates have a minimum length in the middle of the series and greater length progressively outwardly from each side of the middle of the series as shown in Figures 2 and 4. I also angularly cut away end poritons 13 of the strips 12 to provide a "tapering" or blending of more and less opaque portions of the object being radiographed, so as to bring out in the film when developed, greater clarity and detail in the areas which would ordinarily be obscure due to the relatively greater opacity of the portions of the object radiographed at these places, and avoid areas of sharply contrasted exposure on the film.

While I have shown the strips 12 relatively uniformly spaced in Figures 2 and 4, it will be observed that this is an exemplification of an arrangement of these strips which could be successfully used in radiographing an object having the form and cross section shown approximately in Figure 1. It will be obvious that had the object 7 shown in Figure 1 an irregular cross section and had it portions of cross section more opaque than other portions, it would require a corresponding increase of exposure time, and hence a smaller size and bulk of the strips which would be arranged in the same general fashion which is exemplified in the arrangement of these strips 12 for radiographing the object 7. It will be understood, of course, that besides lead and other X-ray opaque metals, other non-metallic substances may be used according to requirements to constitute the strips 12.

A mathematical explanation of the variance in time of exposure over different areas of the film procured by the present invention can be derived as follows:—

Let $a$ equal the width of one of the X-ray impervious plates 12; and let $b$ equal the width of the X-ray pervious space between two adjacent plates 2;

Then $a+b$ equals the distance from a given point on one of the adjacent plates 12 to the corresponding point on the adjacent plate 12; for example, from the right hand edge of the one plate to the right hand edge of the adjacent plate, the distance is $a+b$.

If the mentioned plates are caused to move at a uniform rate of speed while the X-ray tube is active, it follows that when the X-ray impervious plate lies between the tube and the film, the corresponding part of the film receives no radiation at all from the tube, and that that part of the film not thus shielded by the said plate receives full radiation from the tube.

Let T be the length of time that it takes for the filter to travel the distance $a+b$. Then the time of exposure of a given area of film is:

$$\frac{b}{a+b} \times t$$

An example of what I mean is:—

Assume that the plate has a width of one (1) inch and the X-ray transparent area has a width of one (1) inch, and that the rate of travel is two (2) seconds for two (2) inches. Then, time of exposure would be:

$$\frac{1}{1+1} \times 2$$

or one (1) second.

Other parts of the film that had no plates over them would receive the full length of exposure of two (2) seconds.

If the plates are tapered or if the width of the plate is reduced so that the width $b$ is increased at one end of the plates, then the film area covered where $b$ is greater receives a longer exposure than where $b$ is less.

Since the distance $a+b$ is kept uniform, when $a$ is increased, $b$ is increased; therefore, if in the upper part of the film $a$ is equal to $2b$, and in the central portion of the film $a$ equals $b$, and in the lower portion of the film $a$ is absent. The length of exposure would be $$\frac{1}{1+2} \times t, \text{ or } \frac{1t}{3}$$

for the portion. The length of exposure would be $$\frac{1}{1+1} \times t, \text{ or } \frac{1t}{2}$$

for the portion. The length of exposure for the lower portion would be $$\frac{1}{1+0} \times t,$$

or full exposure for the lower portion. It would probably be slightly more accurate to refer to my device not as a filter, but as a shutter for reducing time of exposure over different areas of the film without affecting other areas in the same degree.

Although I have shown and described herein a preferred embodiment of my invention, it is to be definitely understood that I do not desire to limit the application of the invention thereto, and any change or changes may be made in material and structure and arrangement of parts and in the steps and operations involved in the method, within the spirit of the invention and the scope of the subjoined claims.

What is claimed is:—

1. An X-ray filter for disposition between a primary source of X-ray radiation and one side of the object to be radiographed for affecting a film disposed at the opposite side of said object, said filter comprising a sheet of X-ray transparent material, a series of relatively thin, X-ray opaque trapezoidal strips mounted flatwise thereon in parallel, spaced relation, said strips being of graduated length and approximately equal width, and means for moving said filter across the path of said X-radiation in a plane parallel to the plane of said film during a radiographic exposure.

2. An X-ray filter for disposition between a primary source of X-ray radiation and one side of the object to be radiographed for affecting a film disposed at the opposite side of said object, said filter comprising a sheet of X-ray transparent material, a series of relatively thin, X-ray opaque trapezoidal strips mounted flatwise thereon in parallel, spaced relation, said strips being of graduated length and of variable width, and means for moving said filter across the path of said X-radiation in a plane parallel to the plane of said film during a radiographic exposure.

3. An X-ray filter for disposition between a primary source of X-ray radiation and one side of the object to be radiographed for affecting a film disposed at the opposite side of said object, said filter comprising a sheet of X-ray transparent material, a series of relatively thin X-ray opaque trapezoidal strips mounted flatwise thereon in parallel, unequally spaced relation, said strips being of graduated length and approximately equal width, and means for moving said filter across the path of said X-radiation in a plane parallel to the plane of said film during a radiographic exposure.

BEN BUTLER RANEY.